US009815489B2

(12) United States Patent
Lingemann

(10) Patent No.: US 9,815,489 B2
(45) Date of Patent: Nov. 14, 2017

(54) DEVICE FOR PRESSING A GEAR RACK AGAINST A PINION

(71) Applicant: TRW Automotive GmbH, Alfdorf (DE)

(72) Inventor: Markus Lingemann, Bochum (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 14/414,521

(22) PCT Filed: Jul. 11, 2013

(86) PCT No.: PCT/EP2013/064737
§ 371 (c)(1),
(2) Date: Jan. 13, 2015

(87) PCT Pub. No.: WO2014/009497
PCT Pub. Date: Jan. 16, 2014

(65) Prior Publication Data
US 2015/0166098 A1    Jun. 18, 2015

(30) Foreign Application Priority Data

Jul. 13, 2012   (DE) ........................ 10 2012 013 970

(51) Int. Cl.
*B62D 3/12* (2006.01)
*F16H 55/28* (2006.01)

(52) U.S. Cl.
CPC ........... *B62D 3/123* (2013.01); *F16H 55/283* (2013.01); *F16H 2055/281* (2013.01); *Y10T 74/19623* (2015.01)

(58) Field of Classification Search
CPC . B62D 3/123; B62D 3/12; B62D 3/00; B62D 3/02; F16H 55/283; F16H 55/28;
(Continued)

(56) References Cited

U.S. PATENT DOCUMENTS 3,844,182 A    10/1974   Bradshaw et al.
7,487,984 B1    2/2009   Lemont, Jr. et al.
(Continued)

FOREIGN PATENT DOCUMENTS

CN    101254795 A    9/2008
CN    101402371 A    4/2009
(Continued)

OTHER PUBLICATIONS

International Search Report for PCT/EP2013/064737 dated Mar. 27, 2014.
(Continued)

*Primary Examiner* — William Kelleher
*Assistant Examiner* — Joseph Brown
(74) *Attorney, Agent, or Firm* — MacMillan, Sobanski & Todd, LLC

(57) ABSTRACT

A device for pressing a rack against a pinion, comprises a housing, a thrust piece which is shiftably guided in the housing along a pressing axis, a bearing element which can axially be fixed at the housing, an axially pressurized force introduction member, and wedge members which each support on the thrust piece, on the bearing element and on the force introduction member, wherein at least three wedge members uniformly distributed in circumferential direction are provided, and wherein the force introduction member urges the wedge members radially to the outside and the thrust piece axially away from the bearing element.

25 Claims, 6 Drawing Sheets

(58) Field of Classification Search
CPC ....... F16H 2055/281; F16H 2057/2057; F16H 2057/12; F16H 2057/126; F16H 55/00; F16H 55/02; F16H 55/26; F16H 55/286; Y10T 74/19623; Y10T 74/18096
USPC .............................................. 74/422, 388 PS
See application file for complete search history.

(56) References Cited

U.S. PATENT DOCUMENTS

| | | | |
|---|---|---|---|
| 7,654,166 B2 | 2/2010 | Heo | |
| 7,930,951 B2* | 4/2011 | Eickholt | B62D 3/123 74/388 PS |
| 7,954,396 B2* | 6/2011 | Rombold | B62D 3/123 74/29 |
| 8,465,034 B2 | 6/2013 | Heo | |
| 8,887,590 B2* | 11/2014 | Lee | B62D 3/123 74/388 PS |
| 8,984,978 B2* | 3/2015 | Yang | B62D 3/123 74/409 |
| 9,003,909 B2* | 4/2015 | Yang | B62D 3/123 280/93.514 |
| 2008/0250886 A1* | 10/2008 | Song | B62D 3/123 74/422 |
| 2008/0295629 A1* | 12/2008 | Song | B62D 3/123 74/422 |
| 2010/0024583 A1* | 2/2010 | Kawakubo | B62D 3/123 74/422 |
| 2011/0193331 A1* | 8/2011 | Heo | B62D 3/123 280/779 |
| 2011/0303044 A1* | 12/2011 | Lee | B62D 3/123 74/492 |

FOREIGN PATENT DOCUMENTS

| | | | | |
|---|---|---|---|---|
| CN | 101410288 A | 4/2009 | | |
| DE | 2342424 A1 | 3/1974 | | |
| DE | 10230600 A1 | 1/2004 | | |
| DE | 102004025247 A1 * | 12/2005 | ............ | B62D 3/123 |
| DE | 102006016110 A1 | 10/2007 | | |
| DE | 202010011990 U1 | 11/2010 | | |
| DE | 102010039202 A1 | 2/2012 | | |
| WO | 2005113318 A1 | 12/2005 | | |
| WO | 2009097648 A1 | 8/2009 | | |
| WO | 2012028294 A1 | 3/2012 | | |

OTHER PUBLICATIONS

German Search Report, Application No. DE 1020120139705, dated Mar. 15, 2013.
Notification of the First Chinese Office Action, Application No. 2013800372775 dated Dec. 31, 2015.

* cited by examiner

DEVICE FOR PRESSING A GEAR RACK AGAINST A PINION

CROSS-REFERENCE TO RELATED APPLICATIONS

This application is a national stage of International Application No. PCT/EP2013/064737 filed Jul. 11, 2013, the disclosures of which are incorporated herein by reference in entirety, and which claimed priority to German Patent Application No. 10 2012 013 970.5 filed Jul. 13, 2012, the disclosures of which are incorporated herein by reference in entirety.

BACKGROUND OF THE INVENTION

This invention relates to a device for pressing a rack against a pinion as well as a rack-and-pinion steering system for motor vehicles with such pressing device.

Rack-and-pinion steering systems are known from the prior art in various configurations. Due to their operating principle, all rack-and-pinion steering systems include a steering gear with a rack and a pinion, wherein the pinion meshes with a toothed region of the rack. A rotational force applied onto the steering shaft and the pinion via the steering wheel is converted into a rack normal force and passed on to steerable wheels of a vehicle. Usually, rack-and-pinion steering systems nowadays are formed as hydraulic, electrohydraulic or electric power-assisted steering systems which support a vehicle operator in the steering operation.

Since considerable forces occasionally occur in the steering gear, it has already been recognized quite early that particular measures must be taken, in order to keep the rack in engagement with the pinion with as little backlash as possible. Otherwise, there is a risk that under load the rack moves away from the pinion by being deformed transversely to the longitudinal direction of the rack. There would at least occur an undesired increase of the backlash in the steering system, in the extreme case even slipping through of the steering system.

In order to prevent this, a thrust piece usually is employed in the region of the pinion, which urges the rack against the pinion with a rather constant pressing force. Adjusting the desired pressing force, taking account of wear phenomena as a result of the sliding friction between thrust piece and rack, which occurs during the steering operation, and avoiding disturbing rattling noise during the vehicle operation constitute the greatest challenges for pressing devices for rack-and-pinion steering systems.

U.S. Pat. No. 7,654,166 B2 already describes a pressing device for rack-and-pinion steering systems, which in operation of the vehicle operates largely free from backlash and hence particularly quietly and in addition allows an adjustment of the pressing force of the thrust piece.

To keep the pressing device largely free from backlash, two separate wedge members are provided in this document, whose inclined wedge surfaces engage the thrust piece. The two wedge members are urged against each other by a spring element transversely to a pressing axis, and via the wedge surfaces the radial force is converted into an axial force which axially presses the thrust piece against the rack. In this case, however, the assembly of the device, in particular the radial alignment and centering of the wedge members relative to the thrust piece, the provision of a sufficient axial pressing force by the radially acting spring element, and the exact pressurization of the thrust piece in axial direction via the two inclined wedge surfaces turns out to be expensive and problematic. An off-center or not exactly axially aligned pressurization of the thrust piece can lead to jamming of the pressing device and thus to an undesired "jerking" of the steering wheel during the steering operation.

DE 10 2010 039 202 A1 discloses a pressing device for rack-and-pinion steering systems, in which in the case of wear the thrust piece is to readjust itself by maintaining a desired backlash. For this purpose, the pressing device includes a housing part in which a piston loaded by a thrust piece spring in direction of the rack is shiftably guided. Furthermore a spindle is provided, which is coupled with the thrust piece by means of a first threaded connection not rotatable by axial force and is connected with a nut by means of a second threaded connection rotatable by axial force, wherein the piston forms a coupling with the nut and limits a movement of the nut relative to the piston in a direction facing away from the rack. The pressing device furthermore includes a readjusting spring which is arranged between the thrust piece and the piston and loads the thrust piece with a spring force in direction of the rack. Finally, the pressing device also comprises a stop which limits the path of the nut in direction of the rack. Due to its complex construction, however, the proposed pressing device is comparatively expensive in manufacture and assembly.

BRIEF SUMMARY OF THE INVENTION

It is a feature of the invention to create a pressing device for rack-and-pinion steering systems, which with little assembly effort compensates wear phenomena and ensures an exactly aligned, uniform and sufficiently large pressurization of the thrust piece in axial direction.

According to the invention this feature is solved by a device for pressing a rack against a pinion, comprising a housing, a thrust piece which is shiftably guided in the housing along a pressing axis, a bearing element which can axially be fixed at the housing, an axially pressurized force introduction member, and wedge members which each support on the thrust piece, on the bearing element and on the force introduction member, wherein at least three wedge members uniformly distributed in circumferential direction are provided, and wherein the force introduction member on the one hand urges the wedge members radially to the outside and on the other hand urges the thrust piece axially away from the bearing element. The mostly considerable, desired axial pressing force of the thrust piece in this case can easily and reliably be produced via a direct axial pressurization of the force introduction member.

Preferably, the wedge members of the pressing device are made of plastics. Since the occurring loads can easily be absorbed by choosing a suitable plastic material, the plastic version offers advantages with respect to weight, manufacturing costs and adaptable shape.

In one embodiment of the device for pressing the rack against the pinion, the wedge members are movable relative to each other. Furthermore, the wedge members can be connected with each other by means of coupling elements, in particular by means of flexible coupling elements, whereby the number of individual components is reduced and the assembly effort for the pressing device is decreased.

In this embodiment, in particular two wedge members adjacent in circumferential direction can each be connected by a flexible coupling element. This represents a simple possibility for positioning all wedge members relative to each other and yet maintain an individual, radial movability.

Particularly preferably, the wedge members are designed integrally with the coupling elements and form a wedge member unit. This wedge member unit in particular can be fabricated of plastics with little expenditure and in addition requires no preassembly in which individual wedge members must be connected with each other via separate coupling elements.

Preferably, an element elastic in axial direction, in particular an O-ring or a disk spring, is axially provided between the bearing element and the thrust piece. With this elastic element e.g. manufacturing tolerances in the steering gear can be compensated without a movement of the rack being undesirably impeded by the thrust piece during a steering maneuver.

In a further embodiment of the pressing device the force introduction member includes a cone portion with which it supports on substantially complementarily formed contact surfaces of the wedge members. As a result of the cone-shaped portion at the force introduction member and the at least three uniformly distributed wedge members, a radial centering of the force introduction member relative to the wedge members occurs.

Moreover, an end face of the thrust piece facing the wedge members can include a cone-shaped portion on which substantially complementarily formed contact surfaces of the wedge members support. As a result of this conical or frustoconical formation of the thrust piece on the end face facing the wedge members and as a result of the at least three wedge members uniformly distributed in circumferential direction, a radial centering of the wedge members with respect to the pressing axis occurs. In the centered position, the radial force components cancel each other out and the thrust piece is uniformly urged against the rack in axial direction. The end face of the thrust piece in particular is formed as "straight" cone or truncated cone, i.e. as cone in which the tip is located centrally above the base area or as truncated cone in which the base area and the top area are arranged in parallel and concentrically.

In one embodiment of the pressing device a spring element is provided, which supports on the force introduction member and on the thrust piece, so that the force introduction member is axially urged away from the thrust piece. For example, the spring element is formed as coil spring which extends in axial direction. Thus, an almost arbitrary axial pressing force can be produced in a simple way, which by suitable choice of the spring element can be adjusted very precisely.

Alternatively, a spring element can be provided, which supports on the force introduction member and on the bearing element, so that the force introduction member is axially urged away from the bearing element. In this case, too, the spring element for example can be a coil spring which extends in axial direction. Function and effect of the spring element in essence are identical with the aforementioned embodiment. In terms of structure, the two design variants chiefly differ in that in the one case the thrust piece and in the other case the bearing element forms a receiving space for the spring element. Usually it is recommendable to accommodate the spring element in the thrust piece, as its axial guidance in the housing is improved distinctly with increasing axial dimension. But since for the axial guidance merely an outer jacket is required, an unused volume is left in the interior of the thrust piece, which easily can accommodate the spring element.

In a further embodiment of the pressing device, the wedge members flare in axial direction in a wedge-shaped manner, as seen radially from the inside to the outside. To reduce the surface pressures, the wedge members also can flare in circumferential direction, as seen radially from the inside to the outside, and form segment-shaped, in particular circular segment-shaped wedge members.

The invention moreover also comprises a rack-and-pinion steering system for motor vehicles, comprising a housing, a rack shiftably mounted in the housing, a pinion which engages into the rack, and an above-described device which urges the rack against the pinion.

Other advantages of this invention will become apparent to those skilled in the art from the following detailed description of the preferred embodiments, when read in light of the accompanying drawings.

DETAILED DESCRIPTION OF THE INVENTION

Figure 1:
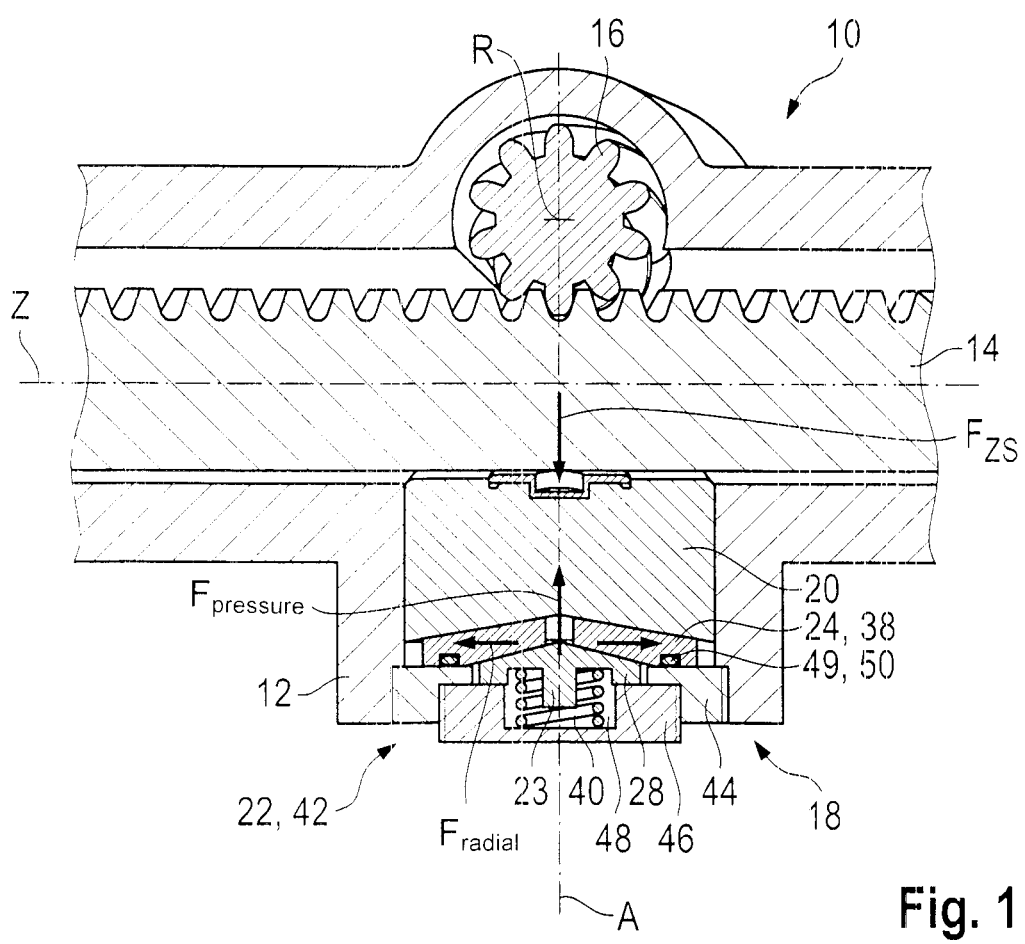
FIG. 1 shows a detail section through a rack-and-pinion steering system according to the invention with an inventive pressing device in the state of use.
Figure 2:
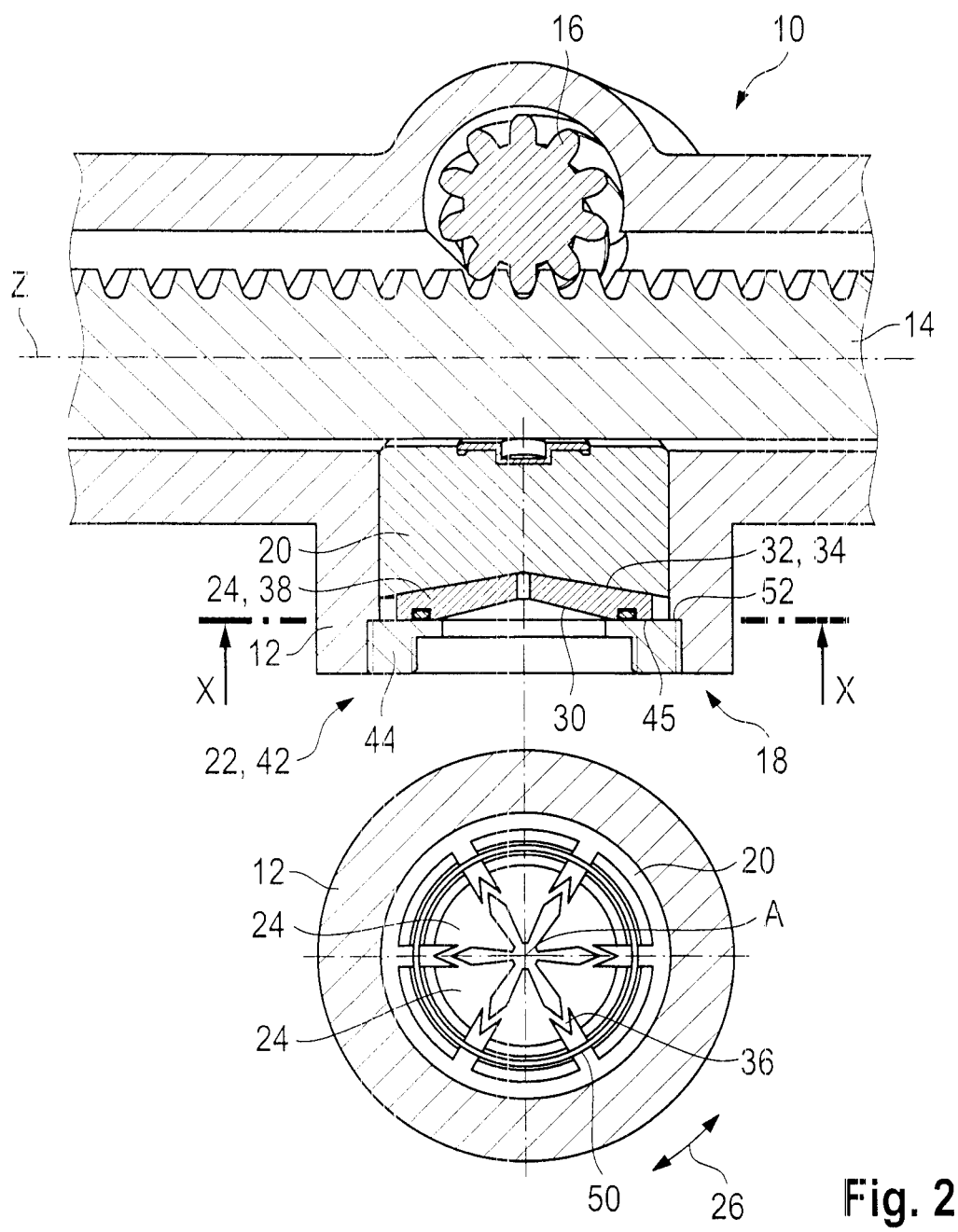
FIG. 2 shows two detail sections through the rack-and-pinion steering system according to FIG. 1 with the inventive pressing device in the assembled stated.

FIGS. 1 and 2 show a section of a rack-and-pinion steering system 10 for motor vehicles, comprising a housing 12, a rack 14 longitudinally shiftably mounted in the housing 12, a pinion 16 which engages into the rack 14, and a pressing device 18 which urges the rack 14 against the pinion 16. The pressing device 18 according to FIG. 1 is shown in a state of use and according to FIG. 2 in an assembled state.

The housing 12 of the pressing device 18 in the present case is designed integrally with the housing 12 of the rack-and-pinion steering system 10. Alternatively, however, the pressing device 18 also can include a housing 12 which then is attached to a separate housing of the rack-and-pinion steering system 10.

The device 18 for pressing the rack 14 against the pinion 16 comprises the housing 12, a thrust piece 20 which is shiftably guided in the housing 12 along a pressing axis A, a bearing element 22 which can axially be fixed at the housing 12, an axially pressurized force introduction member 23 as well as several wedge members 24 which each support on the thrust piece 20, on the bearing element 22 and on the force introduction member 23.

The pressing axis A in essence extends vertically, i.e. radially to a rack axis Z. In addition, the pinion 16 and the thrust piece 20 are arranged on opposite sides of the rack 14 such that an axis of rotation R of the pinion 16 and the pressing axis A of the pressing device 18 intersect each other. Alternatively, however, the pinion 16 and the thrust piece 20 also can be arranged such that the axis of rotation R and the pressing axis A are offset to each other.

To ensure centering of the wedge members 24 relative to the thrust piece 20 and to the force introduction member 23, at least three wedge members 24 generally are provided, which are uniformly distributed in circumferential direction 26, wherein the force introduction member 23 both urges the thrust piece 20 axially away from the bearing element 22 and urges the wedge members 24 radially to the outside.

For this purpose, the force introduction member 23 includes a cone portion 28 with which it supports on the substantially complementarily formed contact surfaces 30 of the wedge members 24. When the force introduction member 23 is axially urged against the wedge members 24, the same hence are pressurized not only axially, but also radially to the outside.

The thrust piece 20 also includes a cone-shaped thrust-piece portion on a side facing the wedge members 24. Concretely, an end face 32 of the thrust piece 20 facing the wedge members 24 according to FIGS. 1 and 2 forms a shell surface of a "straight" cone in which the cone tip is located centrally above the circular base area. Substantially complementarily formed contact surfaces 23 of the wedge members 24 support on this shell surface, wherein in the present exemplary embodiment there are provided six wedge members 24 uniformly distributed in circumferential direction 26 (cf. FIG. 2).

FIG. 2 shows both a longitudinal section and a cross-section X-X of the pressing device 18. The cross-section X-X clearly shows that the individual wedge members 24 are connected with each other by flexible coupling elements 36, but nevertheless are movable relative to each other. Concretely, the coupling elements 36 each connect two wedge members 24 adjacent in circumferential direction 26.

In the present case, the wedge members 24 and the coupling elements 36 are made of plastics and formed integrally as wedge member unit 38.

This integrally formed wedge member unit 38 considerably simplifies the assembly of the pressing device 18, since the wedge members 24 need not be positioned individually in the housing 12.

The pressing device 18 furthermore comprises a spring element 40 which supports on the force introduction member 23 and on the bearing element 22, so that the force introduction member 23 is axially urged away from the thrust piece 20. In the present case, the spring element 40 is a compression spring formed as coil spring, which extends in axial direction and provides a desired axial pressing force $F_{pressure}$.

With reference to FIGS. 1 and 2, the mode of operation and the advantages of the illustrated pressing device 18 will be described below:

In an assembled state of the pressing device 18 according to FIG. 2, the thrust piece 20 and the wedge members 24 or the wedge member unit 38 are arranged in an opening 42 of the housing 12, wherein at least the thrust piece 20 is accommodated in the housing opening 42 with a precise fit, but axially shiftably in radial direction with respect to the pressing axis A.

In the present case, the bearing element 22 is of the multipart type and comprises an outer ring 44 as well as an inner lid 46.

In the exemplary embodiment according to FIG. 1, the inner lid 46 has a recess 48 for accommodating the spring element 40 on a side facing the thrust piece 20.

The outer ring 44 of the bearing element 22 adjoins contact surfaces 45 of the wedge members 24 and forms an axial bearing for the wedge members 24.

To hold the thrust piece 20 and the wedge members 24 or the wedge member unit 38 in the opening 42 of the housing 12, the outer ring 44 of the bearing element 22 is attached to the housing 12. For this purpose, an external thread of the outer ring 44 is screwed into an internal thread of the opening 42, so that the outer ring 44 of the bearing element 22 is adjustable in axial direction relative to the housing 12.

Axially between the bearing element 22, concretely the outer ring 44 of the bearing element 22, and the thrust piece 20 an element 50 elastic in axial direction is provided. According to FIGS. 1 and 2, this elastic element 50 is an O-ring, for example made of rubber, which increases the friction between the wedge members 24 and the bearing element 22 and provides a predetermined, desired axial backlash in the pressing device 18. In the case of an overload, i.e. when a rack force $F_{ZS}$ increases in direction of the pressing axis A beyond the desired pressing force $F_{pressure}$, a certain movement of the thrust piece 20 in direction of the bearing element 22 becomes possible by axial compression of the elastic element 50. Dimensional tolerances in the components of the rack-and-pinion steering system 10 thereby can be compensated without the movement of the rack 14 being noticeably impeded during a steering maneuver.

According to FIGS. 1 and 2, the elastic element 50 is accommodated in a groove 49 of the wedge members 24 and protrudes beyond the wedge members 24 in axial direction.

As elastic element 50, a disk spring for example can also be used as an alternative to the O-ring. The compliance within the pressing device 18 possibly is sufficient already to compensate certain dimensional tolerances in the steering gear of the rack-and-pinion steering system 10, so that no elastic element 50 is necessary.

The outer ring 44 of the bearing element 22 usually is screwed in up to a fixed stop 52 in the housing 12. This stop 52 is chosen such that the thrust piece 20 and the wedge members 24 (or the wedge member unit 38) still have a certain backlash in axial direction.

In a further assembly step, the force introduction member 23 and the spring element 40 are inserted into the opening 42 of the housing 12 and attached to the housing 12 by means of the inner lid 46 (cf. FIG. 1).

In the present exemplary embodiment, an external thread of the inner lid 46 therefore is screwed into an internal thread of the outer ring 44. When the inner lid 46 is screwed in, the spring element 40 is pretensioned, so that it axially urges the force introduction member 23 against the wedge members 24. For example, the inner lid 46 is screwed into the outer ring 44 until a predetermined torque is reached, which corresponds to a desired pressing force $F_{pressure}$.

Since the force introduction member 23 with its cone portion 28 rests against the substantially complementarily formed contact surfaces 30 of the wedge members 24, the wedge members 24 also are urged radially to the outside by a force $F_{radial}$ as a result of the axial pressing force $F_{pressure}$.

The radial force $F_{radial}$ shifts the wedge members 24 to the outside, until it is compensated by increasing frictional forces, wherein here primarily the compression of the elastic element 50 and the resulting increase in the surface pressure between the wedge members 24 and the thrust piece 20 is to be mentioned.

When this equilibrium of forces is reached, the elastic element 50 between the wedge members 24 and the outer ring 44 preferably provides the above-mentioned, specified axial backlash, i.e. a certain axial distance for compensating dimensional tolerances in the steering gear.

Figure 3:
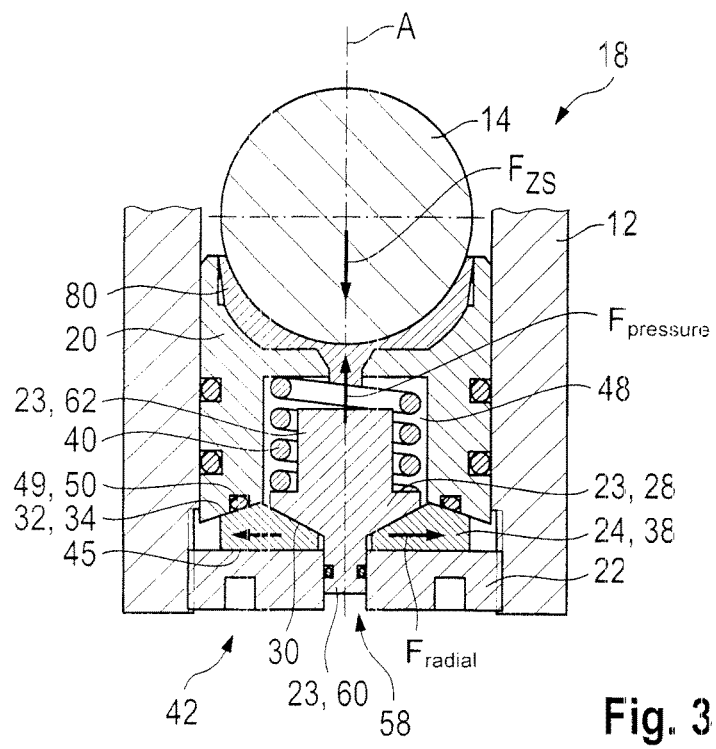
FIG. 3 shows a detail section through the inventive pressing device according to an alternative embodiment in the state of use.
Figure 4:
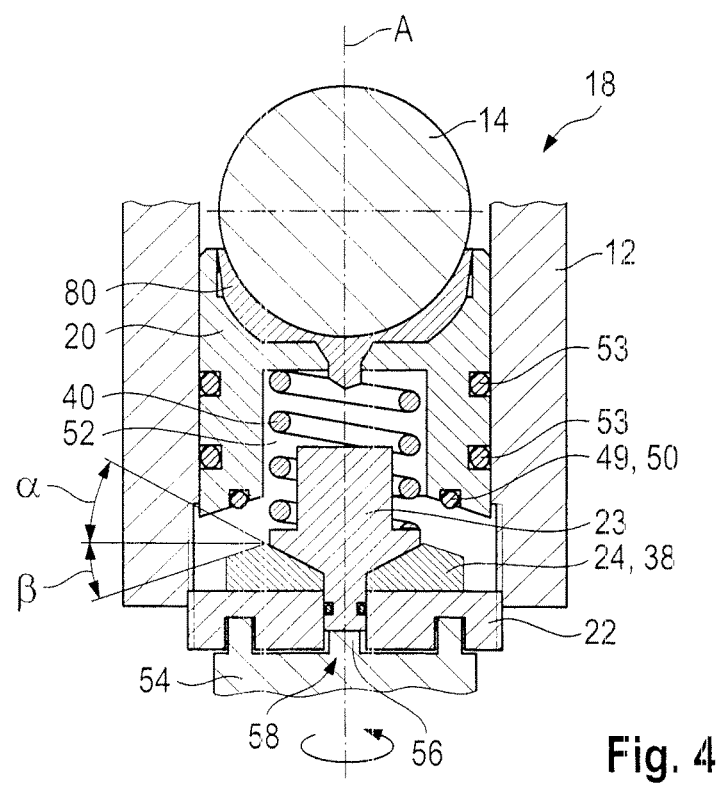
FIG. 4 shows a detail section through the pressing device according to FIG. 3 in the assembled state.

FIGS. 3 and 4 show the device 18 for pressing the rack 14 against the pinion 16 according to an alternative embodiment, which however in its basic construction and general mode of operation substantially corresponds to the embodiment according to FIGS. 1 and 2, so that in this respect explicit reference is made to the above description and in the following merely differences of the embodiments will be discussed.

The force introduction member 23 now is provided between the wedge members 24 and the thrust piece 20, as seen in axial direction, and not, like in the embodiment according to FIGS. 1 and 2, between the wedge members 24 and the bearing element 22. Correspondingly, the spring element 40 no longer supports on the force introduction member 23 and on the bearing element 22, but on the force introduction member 23 and on the thrust piece 20, so that the force introduction member 23 is urged axially away from the thrust piece 20.

Due to this change in construction, the spring element 40 no longer needs to be accommodated in the bearing element 22, so that the bearing element 22 can be designed more compact in axial direction.

Due to this axially more compact design of the bearing element 22, it is possible to increase the axial dimension of the thrust piece 20 with the same installation space requirement, whereby its axial guidance in the housing 12 is improved. Since for the axial guidance a cylindrically shaped outer jacket of the thrust piece 20 is sufficient, the recess 48 for accommodating the spring element 40 can easily be formed in the interior of the thrust piece 20.

According to FIGS. 3 and 4, the elastic element 50 is arranged in the pressing device 18 between the thrust piece 20 and the wedge members 24, but fulfills the same function as in the embodiment according to FIGS. 1 and 2.

FIG. 4 shows an assembled state of the pressing device 18, in which the thrust piece 20, the spring element 40, the force introduction member 23 and the wedge members 24 or the wedge member unit 38 are arranged in the opening 42 of the housing 12, wherein at least the thrust piece 20 is accommodated in the housing opening 42 with a precise fit, but axially shiftably in radial direction with respect to the pressing axis A. For radially damping the thrust piece 20 in the housing 12, two O-rings 53 are provided according to FIGS. 3 and 4, which each are accommodated in a circumferential groove of the thrust piece 20.

The bearing element 22 is formed integrally in this embodiment and is screwed into the housing opening 42 by means of a suitable tool 54. For this purpose, an external thread is provided at the bearing element 22 and a complementary internal thread at the opening 42 of the housing 12. To initially prevent a radial load of the wedge members 24 during assembly, the tool 54 includes a mandrel 56 which extends through an opening 58 in the bearing element 22 and engages an axial tab 60 of the force introduction member 23. Correspondingly, a predetermined torque can be applied onto the tool 54, in order to subsequently adjust a desired normal position by selectively turning back the bearing element 22.

After removing the tool 54, the mandrel 56 no longer is an axial bearing for the force introduction member 23, so that the cone portion 28 of the force introduction member 23 supports on the wedge members 24 and urges the same radially to the outside (FIG. 3).

Analogous to the embodiment according to FIGS. 1 and 2, the movement of the wedge members 24 radially to the outside is limited by the increase in friction already described above.

According to FIGS. 3 and 4, the force introduction member 23 includes the cone portion 28 which rests against the substantially complementarily formed contact surfaces 30 of the wedge members 24. Furthermore, cylindrical tabs 60, 62 are formed at the axial ends of the force introduction member 23, which engage into the spring element 40 formed as coil spring or into the opening 58 of the bearing element 22.

According to FIGS. 3 and 4, the side of the thrust piece 20 facing the wedge members 24 at least sectionally is formed cone-shaped. Concretely, the end face 32 of the thrust piece 20 forms a shell surface of a truncated cone, on which the substantially complementarily formed contact surfaces 34 of the wedge members 24 support. The end face 32 also includes the groove 49 in which the elastic element 50 is accommodated.

As seen radially from the inside to the outside, the wedge members 24 initially conically flare in axial direction and then again reduce their axial dimension (see FIGS. 3 and 4). In addition, as seen radially from the inside to the outside, the wedge members 24 also flare in circumferential direction 26 and form circular segment-shaped wedge members 24 according to FIG. 2, in order to reduce the surface pressure and hence also the material stress.

For the individual components of the pressing device 18 a suitable material is chosen, depending on the occurring stress and the manufacturing expenditure.

The bearing element 22 according to FIGS. 3 and 4 for example is made of aluminum as cast part or as turned/milled part.

The force introduction member 23 on the other hand is a turned steel part, and depending on the occurring load and the desired friction value a plastic version also is conceivable. In any case, a cone angle α of the force introduction member 23 can be adapted to the respective marginal conditions and requirements with little effort.

The wedge members 24, which in some exemplary embodiments also can form a wedge member unit 38, preferably are fabricated of plastics. In the simplest case a cone ring is turned from the plastic, which subsequently is radially cut up into wedge segments. With this turned part, too, the cone angle α and a cone angle β can easily be adapted to individual specifications.

Figure 5:
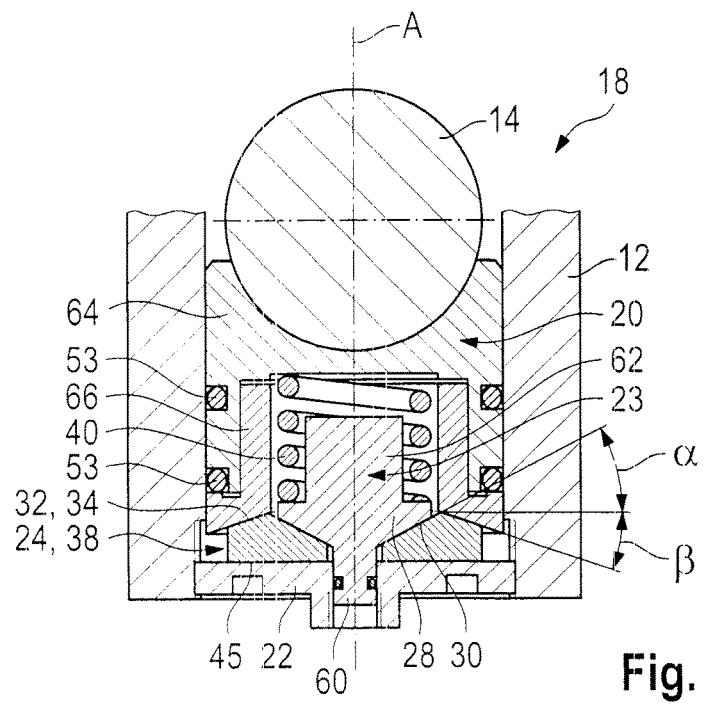
FIG. 5 shows a detail section through the inventive pressing device according to another alternative embodiment in the state of use.

FIG. 5 shows the device 18 for pressing the rack 14 against the pinion 16 according to another embodiment, which in its basic construction and general mode of operation substantially corresponds to the embodiment according to FIGS. 3 and 4, so that with respect to the underlying functional principle reference is made to the above description and in the following merely differences of the embodiments will be discussed.

The two embodiments of the pressing device 18 merely differ by the construction of the thrust piece 20, which in FIGS. 3 and 4 is designed in one part. The thrust piece 20 according to FIG. 5 on the other hand is constructed of two parts, of a base body 64 and an insert 66.

The insert 66 is axially movably mounted in the base body 64 and in axial direction supports on the base body 64 via the elastic element 50.

According to FIG. 5, the elastic element 50 is an O-ring, for example made of rubber, and provides a predetermined, desired axial backlash in the pressing device 18. In the case of an overload, i.e. when a rack force $F_{ZS}$ increases in direction of the pressing axis A beyond the desired pressing force $F_{pressure}$, a certain movement of the thrust piece base body 64 in direction of the bearing element 22 becomes possible by axial compression of the elastic element 50. Dimensional tolerances in the components of the rack-and-pinion steering system 10 thereby can be compensated without the movement of the rack 14 being noticeably impeded during a steering maneuver.

According to FIG. 5, the elastic element 50 thus is arranged in the pressing device 18 between the insert 66 and the base body 64 of the thrust piece 20, but fulfills the same function as in the embodiments according to FIGS. 1 to 4.

Since the elastic element 50 according to FIG. 5 at the same time also assumes the function of radially damping the thrust piece 20 in the housing 12, one of the two O-rings 53 can be omitted as compared to the embodiment according to FIGS. 3 and 4.

Figure 6:
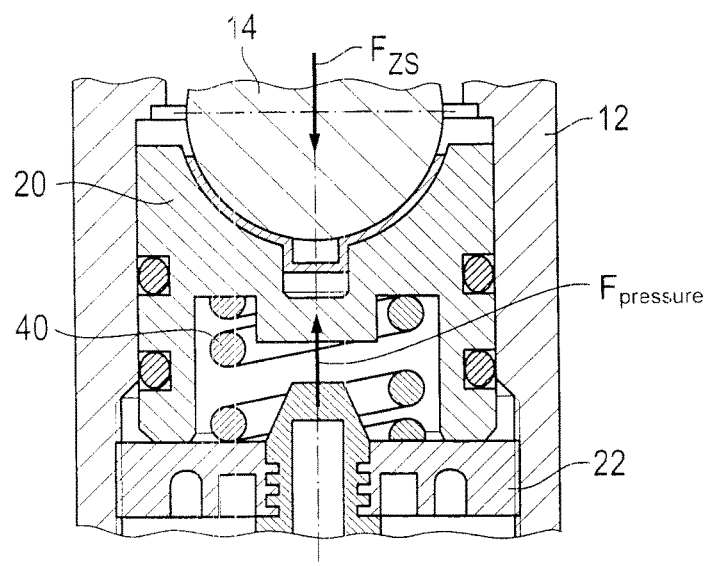
FIG. 6 shows a detail section through a pressing device according to the prior art.

FIG. 6 shows a pressing device 18 for rack-and-pinion steering systems 10 according to the prior art, in which no wedge members 24 are provided for compensating wear phenomena in the rack-and-pinion steering system 10.

Figure 7:
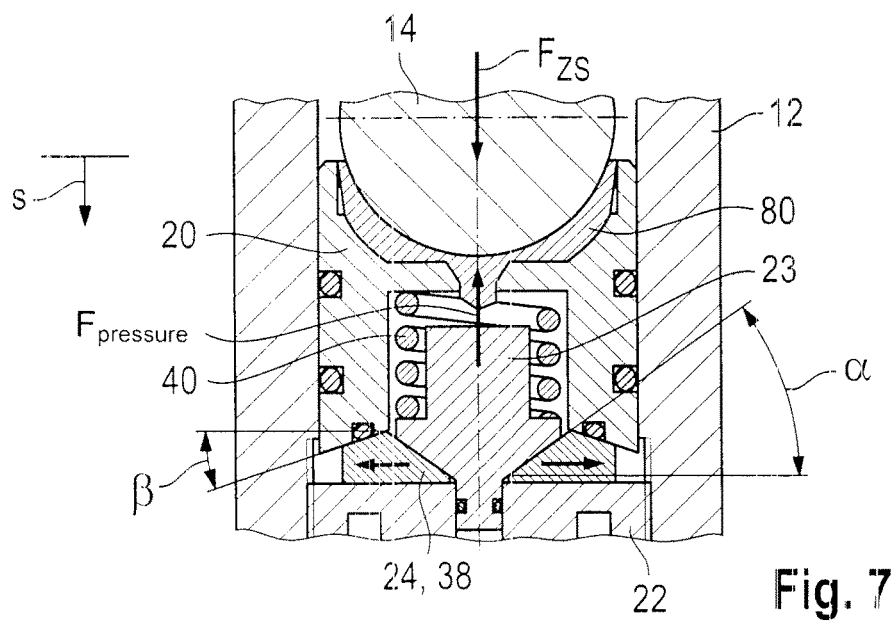
FIG. 7 shows a detail section through the pressing device according to FIG. 3.

FIG. 7, on the other hand, shows an inventive pressing device 18 for a rack-and-pinion steering system 10, in which several wedge members 24 with the cone angles $\alpha$, $\beta$ are provided.

Figure 8:
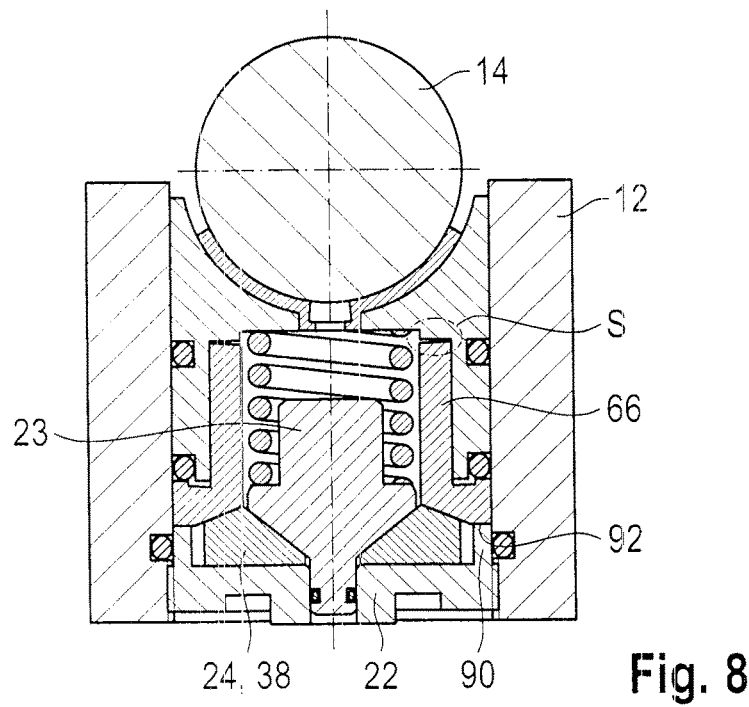
FIG. 8 shows a section through a pressing device according to another embodiment in the initial state.
Figure 9:
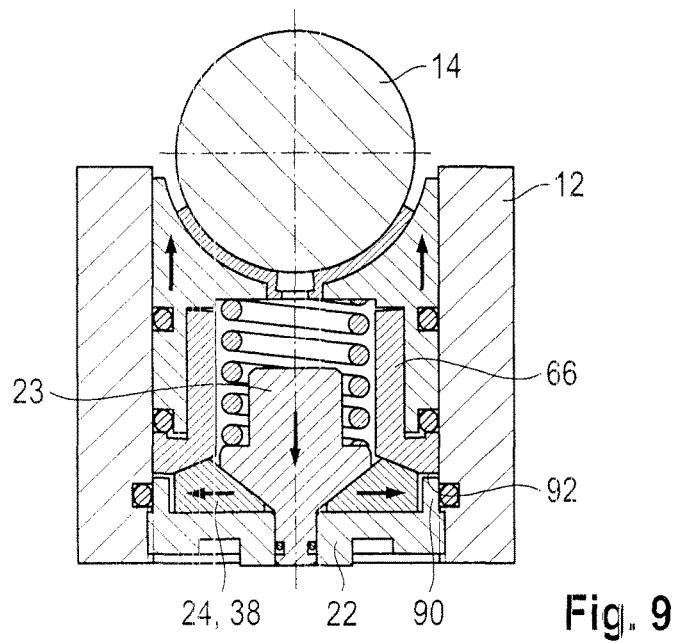
FIG. 9 shows a section through the pressing device of FIG. 8 in the state of use.

In FIGS. 8 and 9 another embodiment is shown. For the components known from the preceding embodiments the same reference numerals are used, and in so far reference is made to the above explanations.

The embodiment according to FIGS. 8 and 9 is based on the embodiment of FIG. 5, but differs from the same by the fact that a supporting element 90 is provided on the bearing element 22. The supporting element 90 here is designed as circumferential collar which extends from the bearing element towards the rack 14.

Against the supporting element 90 a supporting surface 92 can rest, which is provided on the side of the insert 66 facing the bearing element 22. In the initial state, which is shown in FIG. 8, the supporting element 90 defines the maximum distance of the insert 66 from the rack 14.

The supporting element 90 has two functions. During assembly, it first of all can be used for adjusting the predetermined elastic backlash with little effort. First of all, the bearing element 22 is maximally screwed into the housing 12, until all elements (from the bearing element via the insert 66 up to the thrust piece 20) are "on block". The bearing element 22 then is screwed back by a predetermined angle, whereby the predetermined elastic backlash is obtained (see the region marked with "S" between the insert 66 and the thrust piece 20).

The second function of the supporting element 90 consists in that it represents a limitation for the maximum backward movement of the insert 66 on overload. Independent of the state of wear of the wedge members 24 and a possible evasive movement of the wedge members 24 towards the inside, the supporting element 90 limits the extent to which the insert 66 can maximally be urged away from the rack 14 in direction of the bearing element 22.

Figure 10:
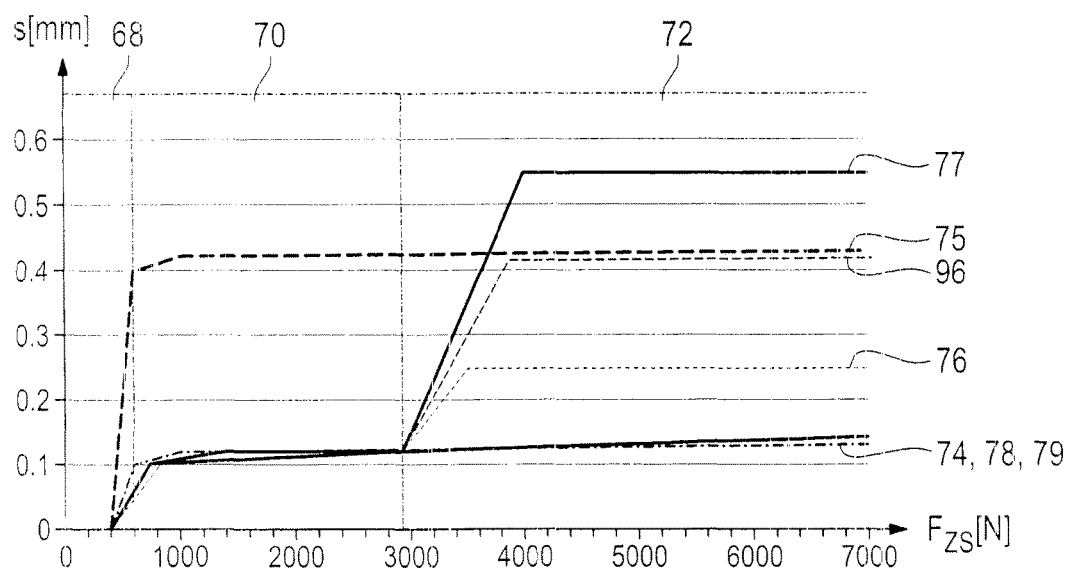
FIG. 10 shows a diagram in which for various pressing devices an axial thrust piece movement is plotted over a rack transverse load occurring in the region of the thrust piece.

FIG. 10 finally shows a diagram in which an axial displacement s of the thrust piece 20 is represented over a rack force $F_{ZS}$, wherein the rack force $F_{ZS}$ is divided into a force region 68 of usual steering maneuvers, a transition region 70 and a force region 72 which indicates a peak load usage of the rack-and-pinion steering system 10.

The behavior of the pressing device 18 according to the prior art (cf. FIG. 6) for a new rack-and-pinion steering system 10 is represented in curve 74 and for a rack-and-pinion steering system 10 which already has been subjected to a certain wear in curve 75.

On the other hand, the behavior of an inventive pressing device 18 with cone angles $\alpha \approx 20°$ and $\beta \approx 30°$ is represented with reference to a curve 76 (for a new rack-and-pinion steering system 10) and with reference to a curve 77 (for a rack-and-pinion steering system 10 with certain wear).

Finally, the behavior of an inventive pressing device 18 with cone angles of $\alpha \approx 40°$, $\beta \approx 10°$ is represented with reference to a curve 78 (for a new rack-and-pinion steering system 10) and with reference to a curve 79 (for a rack-and-pinion steering system 10 with certain wear).

The diagram according to FIG. 10 clearly shows that in conventional rack-and-pinion steering systems 10 an undesired large displacement of the thrust piece 20 is obtained after occurrence of certain wear phenomena in the force region 68 of usual steering maneuvers, which is noticed by the driver as an undesired change in the steering behavior such as e.g. steering backlash or rattling noise of the rack-and-pinion steering system 10 (cf. curves 74, 75).

Due to the pressing device 18 according to the invention, undesired large displacements of the thrust piece 20 only occur in the force region 72, which already indicates a peak load usage of the rack-and-pinion steering system 10 (cf. curves 76, 77). The cone angles $\alpha$, $\beta$ are chosen such that in the force region 72 a radial movement of the wedge members 24 is possible and thus blocking of the rack 14 or an undesired high rack friction is reliably prevented.

As curve 96 the displacement is shown for the embodiment according to FIGS. 8 and 9. It can be seen that due to the additional supporting element 90 the maximally occurring backlash is limited to a smaller value, as compared to the curve 77.

Alternatively, with a suitable adjustment of the cone angles $\alpha$, $\beta$, the respectively desired pressing force $F_{pressure}$, and the respective friction between the force introduction member 23 and the wedge members 24, the wedge members 24 and the thrust piece 20 as well as between the wedge members 24 and the bearing element 22 large thrust piece displacements even can be prevented in the force region 72 (peak load usage of the rack-and-pinion steering system 10) (cf. curves 78, 79). In such a case, the axial backlash of the thrust piece 20 remains at a constantly low level and also is largely uninfluenced by wear phenomena in the rack-and-pinion steering system 10. Advantageously, the driver therefore perceives no undesired change in the steering behavior over almost all load cases acting on the rack-and-pinion steering system 10 (cf. largely constant course of the curves 78, 79 between 600 N and 7000 N) and over the entire period of use of the pressing device 18 (cf. largely identical course of the curves 78 and 79).

The wear occurring in the rack-and-pinion steering system 10, for example in a sliding layer 80 of the thrust piece 20, is compensated in the inventive pressing device 18 by a displacement of the wedge members 24 radially to the outside. A certain, very well desired extent s of axial displacement of the thrust piece 20 is ensured by the elastic element 50 or an otherwise present elasticity in the region of the pressing device 18, and thus the dimensional tolerances occurring in the toothing region can be compensated in terms of design.

In accordance with the provisions of the patent statutes, the principle and mode of operation of this invention have been explained and illustrated in its preferred embodiments.

However, it must be understood that this invention may be practiced otherwise than as specifically explained and illustrated without departing from its spirit scope.

The invention claimed is:

1. A device for pressing a rack against a pinion comprising
a housing,
a thrust piece which is shiftably guided in the housing along a pressing axis,
a bearing element which can axially be fixed at the housing,
an axially pressurized force introduction member, and
wedge members which each are supported on the thrust piece, on the bearing element and on the force introduction member,
wherein at least three wedge members uniformly distributed in a circumferential direction are provided,
wherein the force introduction member urges the wedge members radially to the outside and the thrust piece axially away from the bearing element;
wherein the thrust piece, the wedge members and the force introduction member are separate and distinct components;
wherein the wedge members are moveable relative to each other; and
the wedge members only move radially to the outside, wherein the movement radially to the outside of the wedge members is introduced by the force introduction member when the rack is pressed against the pinion.

2. The device according to claim 1, wherein the wedge members are made of plastics.

3. The device according to claim 1, wherein two wedge members adjacent in the circumferential direction each are connected by a flexible coupling element.

4. The device according to claim 3, wherein the wedge members and the coupling element are formed integrally.

5. The device according to claim 1, wherein axially between the bearing element and the thrust piece an element elastic in an axial direction is provided.

6. The device according to claim 1, wherein the force introduction member includes a cone portion with which it supports on substantially complementarily formed contact surfaces of the wedge members.

7. The device according to claim 1, wherein an end face of the thrust piece facing the wedge members includes a cone-shaped portion on which substantially complementarily formed contact surfaces of the wedge members are supported.

8. The device according to claim 1, wherein a spring element is provided, which are supported on the force introduction member and on the thrust piece, so that the force introduction member is axially urged away from the thrust piece.

9. The device according to claim 1, wherein a spring element is provided, which are supported on the force introduction member and on the bearing element, so that the force introduction member is axially urged away from the bearing element.

10. The device according to claim 1, wherein, as seen radially from inside to outside, the wedge members flare in a wedge-like manner in an axial direction.

11. The device according to claim 1, wherein a supporting element is provided, which limits a backward movement of the thrust piece.

12. A rack-and-pinion steering system for motor vehicles comprising
a housing,
a rack shiftably mounted in the housing,
a pinion which engages with the rack, and
the device according to claim 1, which urges the rack against the pinion.

13. A device for pressing a rack against a pinion comprising
a housing,
a thrust piece which is shiftably guided in the housing along a pressing axis,
a bearing element which can axially be fixed at the housing,
an axially pressurized force introduction member, and
wedge members which each are supported on and continually contact the thrust piece, the bearing element and the force introduction member,
wherein at least three wedge members uniformly distributed in a circumferential direction are provided,
wherein the force introduction member urges the wedge members radially to the outside and the thrust piece axially away from the bearing element;
wherein the thrust piece, the wedge members and the force introduction member are separate and distinct components; and
the wedge members only move radially to the outside, wherein the movement radially to the outside of the wedge members is introduced by the force introduction member when the rack is pressed against the pinion.

14. The device according to claim 13, wherein the wedge members are made of plastics.

15. The device according to claim 13, wherein the wedge members are movable relative to each other.

16. The device according to claim 13, wherein two wedge members adjacent in the circumferential direction each are connected by a flexible coupling element.

17. The device according to claim 16, wherein the wedge members and the coupling element are formed integrally.

18. The device according to claim 13, wherein axially between the bearing element and the thrust piece an element elastic in an axial direction is provided.

19. The device according to claim 13, wherein the force introduction member includes a cone portion with which it supports on substantially complementarily formed contact surfaces of the wedge members.

20. The device according to claim 13, wherein an end face of the thrust piece facing the wedge members includes a cone-shaped portion on which substantially complementarily formed contact surfaces of the wedge members are supported.

21. The device according to claim 13, wherein a spring element is provided, which are supported on the force introduction member and on the thrust piece, so that the force introduction member is axially urged away from the thrust piece.

22. The device according to claim 13, wherein a spring element is provided, which are supported on the force introduction member and on the bearing element, so that the force introduction member is axially urged away from the bearing element.

23. The device according to claim 13, wherein, as seen radially from inside to outside, the wedge members flare in a wedge-like manner in an axial direction.

24. The device according to claim 13, wherein a supporting element is provided, which limits a backward movement of the thrust piece.

25. A rack-and-pinion steering system for motor vehicles comprising
a housing,
a rack shiftably mounted in the housing, a pinion which engages with the rack, and
the device according to claim 13, which urges the rack against the pinion.

* * * * *